US009366008B2

(12) United States Patent
Kokuryou et al.

(10) Patent No.: US 9,366,008 B2
(45) Date of Patent: Jun. 14, 2016

(54) CONSTRUCTION MACHINE

(71) Applicant: HITACHI CONSTRUCTION MACHINERY CO., LTD., Tokyo (JP)

(72) Inventors: Osamu Kokuryou, Koka-shi (JP); Masaya Ueda, Konan (JP); Junya Kawamoto, Moriyama (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 3 days.

(21) Appl. No.: 14/457,151

(22) Filed: Aug. 12, 2014

(65) Prior Publication Data
US 2015/0056052 A1 Feb. 26, 2015

(30) Foreign Application Priority Data

Aug. 21, 2013 (JP) .................................. 2013-171228

(51) Int. Cl.
*E02F 9/08* (2006.01)
*B62D 25/00* (2006.01)
(Continued)

(52) U.S. Cl.
CPC ............... *E02F 9/0866* (2013.01); *B60K 11/04* (2013.01); *B62D 25/00* (2013.01); *E02F 3/32* (2013.01); *E02F 3/325* (2013.01); *E02F 9/0808* (2013.01); *E02F 9/16* (2013.01); *E02F 9/163* (2013.01); *E02F 9/2278* (2013.01); *B60Y 2200/412* (2013.01)

(58) Field of Classification Search
CPC ......... E02F 9/0866; E02F 9/2278; E02F 9/16; E02F 3/32; E02F 9/163; E02F 9/0808; E02F 3/325; B60K 7/00; B62D 25/00
See application file for complete search history.

(56) References Cited

U.S. PATENT DOCUMENTS 4,907,667 A * 3/1990 Yamamoto ............. B60J 5/0487
180/89.13
5,711,095 A * 1/1998 Oda ......................... E02F 3/325
180/327
(Continued)

FOREIGN PATENT DOCUMENTS

JP 10-331657 A 12/1998
JP 2005-350905 A 12/2005
(Continued)

OTHER PUBLICATIONS

Extended European Search Report received in corresponding European Application No. 14181682.7 dated Mar. 5, 2015.
(Continued)

*Primary Examiner* — Brodie Follman
(74) *Attorney, Agent, or Firm* — Mattingly & Malur, PC

(57) ABSTRACT

A heat exchanging device has a frame member mounted on a revolving frame, and this frame member supports an oil-cooler and a radiator. A support member is to support a canopy and the like. The support member is composed of a housing support base provided by extending in the left-right direction on an upper side of the engine and a left front leg part and a left rear leg part each having an upper end mounted on a left-side position in the left-right direction of the housing support base and a lower end mounted on the revolving frame by straddling an engine. The housing support base of this support member has a right side in the left-right direction formed as a free end. Further, the free end of the housing support base is configured to be mounted on the frame member of the heat exchanging device.

2 Claims, 14 Drawing Sheets

(51) Int. Cl.
  *E02F 3/32* (2006.01)
  *E02F 9/16* (2006.01)
  *E02F 9/22* (2006.01)
  *B60K 11/04* (2006.01)

(56) References Cited

U.S. PATENT DOCUMENTS

| | | | | |
|---|---|---|---|---|
| 5,816,350 A * | 10/1998 | Akira | .................... | B60H 1/3227 |
| | | | | 180/68.1 |
| 5,816,351 A * | 10/1998 | Akira | ..................... | B60K 11/08 |
| | | | | 180/68.1 |
| 8,857,549 B2 * | 10/2014 | Kawamoto | .............. | E02F 3/325 |
| | | | | 180/333 |
| 9,062,691 B2 * | 6/2015 | Kawamoto | ............ | E02F 9/0883 |
| 2001/0007292 A1 * | 7/2001 | Yabf | ..................... | E02F 9/0866 |
| | | | | 180/68.1 |
| 2002/0104491 A1 * | 8/2002 | Izumi | ........................ | E02F 9/00 |
| | | | | 123/41.49 |
| 2004/0098983 A1 * | 5/2004 | Naruse | .................... | E02F 3/325 |
| | | | | 60/428 |
| 2005/0210718 A1 * | 9/2005 | Ueda | ..................... | E02F 9/0808 |
| | | | | 37/466 |
| 2009/0242311 A1 * | 10/2009 | Fujita | ................. | B62D 33/0617 |
| | | | | 180/291 |
| 2011/0219762 A1 * | 9/2011 | Kobayashi | ............. | B60K 11/08 |
| | | | | 60/456 |
| 2014/0000726 A1 * | 1/2014 | Kawamoto | ........... | E02F 9/0883 |
| | | | | 137/351 |
| 2014/0301816 A1 * | 10/2014 | Kokuryo | ................ | B60K 11/04 |
| | | | | 414/687 |
| 2015/0056051 A1 * | 2/2015 | Iwamoto | ................ | E02F 9/0875 |
| | | | | 414/687 |
| 2015/0056052 A1 * | 2/2015 | Kokuryou | ............. | B62D 25/00 |
| | | | | 414/687 |

FOREIGN PATENT DOCUMENTS

JP   2013-002236 A   1/2013
WO   2006/132170 A1  12/2006

OTHER PUBLICATIONS

Japanese Office Action received in corresponding Japanese Application No. 2013-171228 dated Jun. 23, 2015.

* cited by examiner

CONSTRUCTION MACHINE

TECHNICAL FIELD

The present invention relates to a construction machine such as a hydraulic excavator that is provided with a support member located in the vicinity of a prime mover, for example, and supporting a rear side of a housing.

BACKGROUND ART

In general, a hydraulic excavator as a typical example of a construction machine is composed of an automotive lower traveling structure and an upper revolving structure rotatably mounted on the lower traveling structure, and a working mechanism tiltably provided on a front side of the upper revolving structure.

Here, the hydraulic excavators include a small-sized hydraulic excavator called a mini shovel for performing a work at a small work site. This small-sized hydraulic excavator is also called a small-sized revolving-type excavator or a rear small-sized revolving-type excavator, for example, and this small-sized revolving-type excavator is formed in a compact manner so that a rear side of the upper revolving structure is substantially accommodated in a vehicle width of the lower traveling structure when the upper revolving structure is turned.

The upper revolving structure of the small-sized hydraulic excavator includes a revolving frame constituting a support structural body, an engine mounted in a laterally-placed state extending in a left-right direction on a rear side of the revolving frame, a heat exchanging device including an oil-cooler provided on the revolving frame on one side in the left-right direction of the engine and cooling hydraulic oil and a radiator for cooling the engine, a support member provided on the revolving frame in a state straddling the engine from an upper side, an operator's seat arranged on a front side of the engine and on which an operator is seated, and a housing such as a canopy provided by covering an upper part of the operator's seat and having a rear side supported by the support member and the like.

Here, the support member is composed of a housing support base provided by extending in the left-right direction above the engine and four leg parts mounted on both sides of the housing support base in the left-right direction, respectively, and having lower ends mounted on the revolving frame across the engine in a front-rear direction of the engine, respectively. These leg parts are provided at positions of front left, rear left, front right, and rear right with respect to the housing support base, respectively. As described above, the housing support base of the support member is arranged above the engine by the four leg parts and supports a rear-side part of the housing at this position (Patent Document 1).

PRIOR ART DOCUMENT

Patent Document

Patent Document 1: Japanese Patent Laid-Open No. 2013-2236 A

SUMMARY OF THE INVENTION

In the hydraulic excavator in Patent Document 1, the support member for supporting the rear side of the housing is composed of the housing support base provided above the engine and the four leg parts supporting this housing support base. When this support member is to be mounted on the revolving frame, each of the four leg parts should be mounted on the revolving frame side, respectively, by using a tightening member including a bolt. Thus, a work for mounting the support member on the revolving frame requires a labor. In addition, since the upper revolving structure needs a space for installing the four leg parts, it makes an obstacle in size reduction of the upper revolving structure. Moreover, if four leg parts are provided, the weight is increased by the number of leg parts, which causes a problem that prevents weight reduction of the hydraulic excavator.

The present invention was made in view of a problem of the aforementioned problem of the conventional art, and an object of the present invention is to provide a construction machine capable of improvement of workability when the support member is to be mounted on the revolving frame, size reduction and weight reduction of the upper revolving structure.

(1) A construction machine according to the present invention comprises: an automotive lower traveling structure, an upper revolving structure rotatably mounted on the lower traveling structure, and a working mechanism tiltably provided on a front side of the upper revolving structure, wherein the upper revolving structure includes: a revolving frame constituting a support structural body; an engine mounted in a laterally-placed state extending in a left-right direction on a rear side of the revolving frame; a heat exchanging device including an oil-cooler provided on the revolving frame by being located on one side in the left-right direction of the engine and cooling hydraulic oil and a radiator for cooling the engine; a hydraulic pump provided by being located on the other side in the left-right direction of the engine; a support member provided on the revolving frame in a state straddling the engine from an upper side; an operator's seat arranged on a front side of the engine and on which an operator is seated; and a housing provided by covering at least an upper part of the operator's seat and having a rear side supported by the support member.

In order to solve the above-described problem, a characteristics of a configuration adopted by the present invention is that the heat exchanging device has a frame member formed of a frame-shaped body supporting the oil-cooler and the radiator and mounted on the revolving frame; the support member is constituted by a housing support base provided by extending in the left-right direction above the engine and a front leg part and a rear leg part each having an upper end mounted on the other side position in the left-right direction of the housing support base and a lower end mounted on the revolving frame straddling the engine in a front-rear direction; the housing support base of the support member is formed with one side in the left-right direction as a free end; and the housing support base of the support member has the free end mounted on the frame member of the heat exchanging device.

With this arrangement, since the frame member of the heat exchanging device supports the oil-cooler and the radiator, it has rigidity and can support a heavy article. Therefore, in the support member, even if a leg part on one side in the left-right direction is omitted and each of the leg parts is provided only on the other side in the left-right direction, the housing support base can be stably supported in a both-side held state by each of the leg parts on the other side and the frame member on the one side by using the frame member of the heat exchanging device.

As a result, when the support member is to be mounted on the revolving frame, the support member can be mounted on the revolving frame only by mounting each of the leg parts located on the other side in the left-right direction on the revolving frame and by mounting the free end (one side) of the housing support base on the frame member of the heat exchanging device. Therefore, the number of work processes when the support member is to be mounted on the revolving frame can be reduced, and the assembling workability can be improved. Further, an installation space on the revolving frame can be effectively used for the portion by which the leg part on the one side in the left-right direction is omitted, and the size of the upper revolving structure can be reduced. Moreover, since the weight of the support member can be reduced for the portion by which the leg part on the one side is omitted, the weight of the hydraulic excavator can be reduced.

(2) According to the present invention, the frame member of the heat exchanging device is formed as a four-cornered frame body formed of a lower frame located on a lower part, extending in a lateral direction, and mounted on the revolving frame, a pair of side frames extending upward from both ends of the lower frame in a length direction, and an upper frame extending in the lateral direction over the upper part of each of the side frames; and the free end of the housing support base is mounted on an upper surface side of the upper frame by using a fastening member.

With this arrangement, the free end of the housing support base constituting the support member can be mounted not on a lower part on the depth but at an upper-part position of the frame member easily accessible as compared with mounting of a lower end of the leg part on the revolving frame. In this point, too, assembling workability can be improved.

(3) According to the present invention, the frame member of the heat exchanging device is configured to be used as the leg part of the support member for supporting the housing support base on the one side in the left-right direction. As a result, the free end of the housing support base can be firmly supported by using the frame member.

MODE FOR CARRYING OUT THE INVENTION

Hereinafter, a small-sized hydraulic excavator provided with an oil-cooler and a radiator on a heat exchanging device will be explained below in detail as a typical example of a construction machine according to an embodiment of the present invention by referring to FIGS. 1 to 14. In this embodiment, the hydraulic excavator of a canopy specification provided with a canopy covering an upper side of an operator's seat is exemplified.

Figure 1:
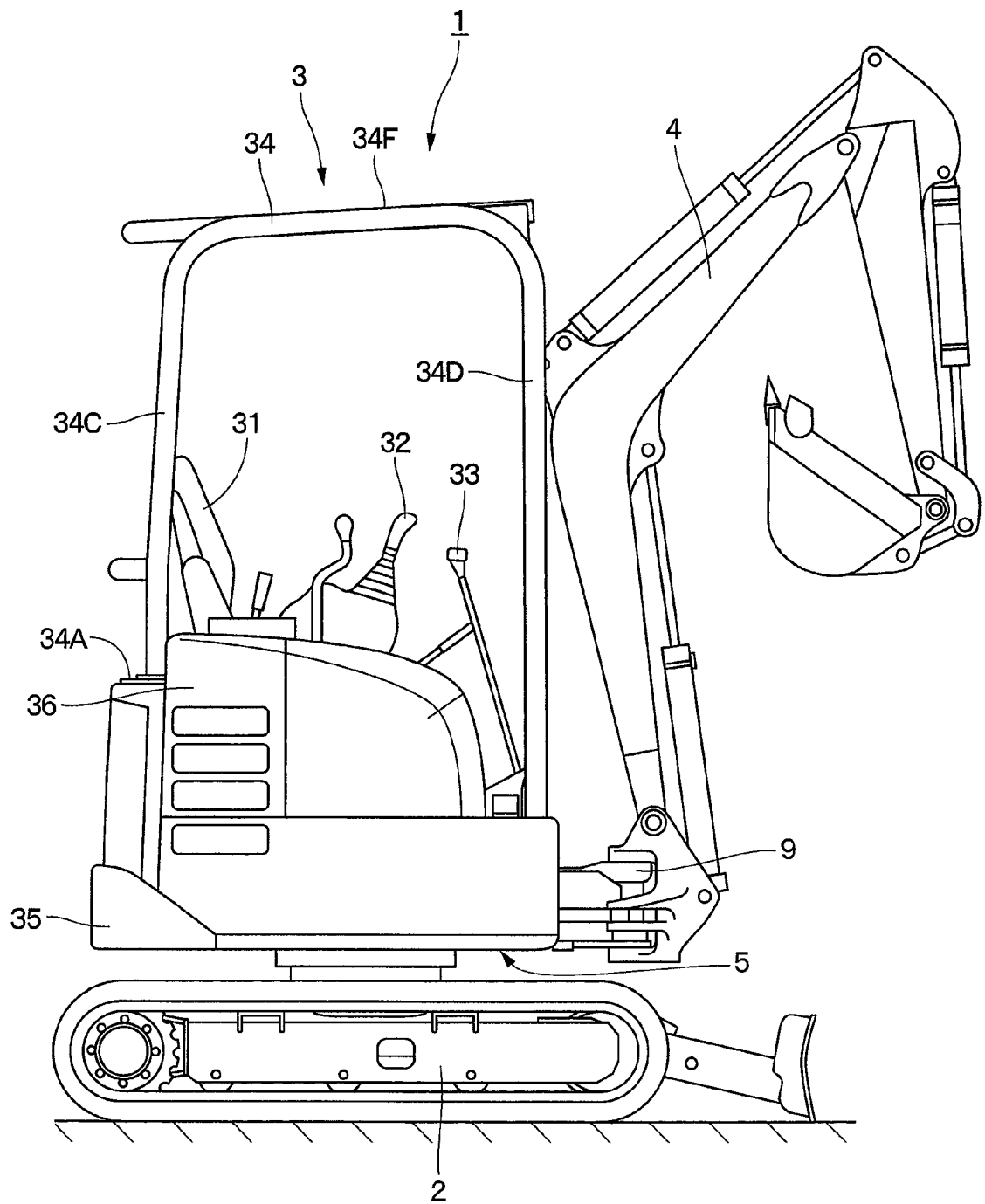
FIG. 1 is a front view showing a small-sized hydraulic excavator with a canopy specification according to an embodiment of the present invention.

In FIG. 1, designated at 1 shows a crawler-type hydraulic excavator as a construction machine according to this embodiment. This hydraulic excavator 1 is a small-sized hydraulic excavator called a mini shovel. The hydraulic excavator 1 is composed of a automotive lower traveling structure 2, an upper revolving structure 3 rotatably mounted on the lower traveling structure 2, and a working mechanism 4 tiltably provided on a front side of the upper revolving structure 3 in a front-rear direction and performing an excavating work of earth and sand and the like.

The upper revolving structure 3 includes a revolving frame 5 which will be described later, an engine 16, a heat exchanging device 17, a hydraulic pump 25, a support member 26, an operator's seat 31, and a canopy 34 as shown in FIGS. 2 to 8.

Figure 9:
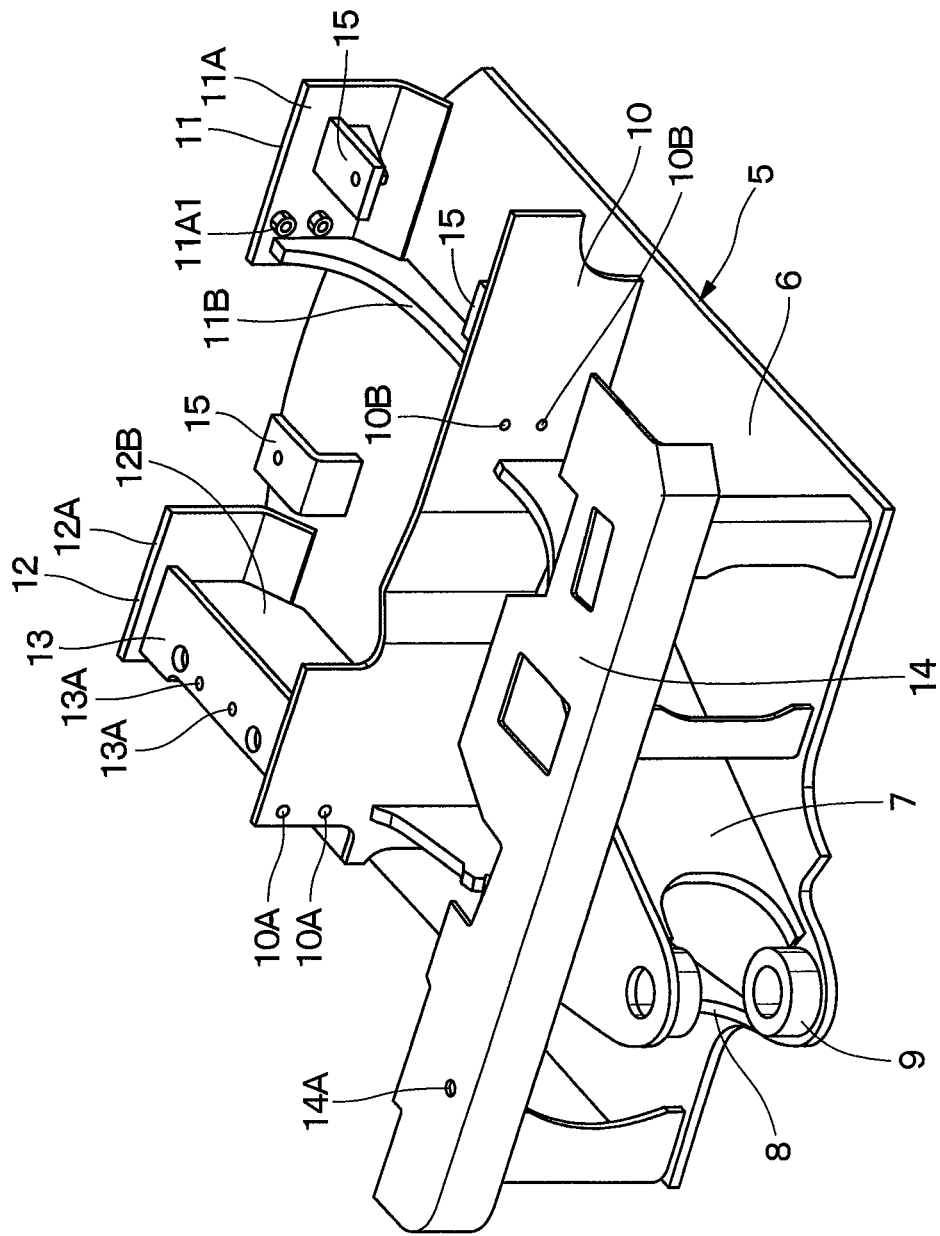
FIG. 9 is a perspective view of a single-body revolving frame when seen from the front left side.

The revolving frame 5 of the upper revolving structure 3 is formed as a support structural body rotatably mounted on the lower traveling structure 2. As shown in FIG. 9, the revolving frame 5 includes a rectangular bottom plate 6 made of a thick flat plate, a left front vertical plate 7 and a right front vertical plate 8 installed upright away from each other in the left-right direction having a substantially V-shape on an upper surface side of the bottom plate 6, a support bracket 9 provided on a front end portion of each of the front vertical plates 7 and 8 and supporting the working mechanism 4, a partition plate 10 extending in the left-right direction at a rear end position of each of the front vertical plates 7 and 8 and installed upright on the bottom plate 6, a left rear vertical plate 11 installed upright so as to continue to the rear side of the left front vertical plate 7 sandwiching the partition plate 10, a right rear vertical plate 12 installed upright so as to continue to a rear side of the right front vertical plate 8 sandwiching the partition plate 10, a heat exchanging device mounting base 13 provided by extending in the front-rear direction on the upper side of the right rear vertical plate 12, a floor mounting member 14 located on a front side of the bottom plate 6 and provided by extending in the left-right direction on the upper side of each of the front vertical plates 7 and 8, and a plurality of, four pieces of, for example, engine brackets 15 (only three are shown) located on the rear side of the bottom plate 6 and provided on the bottom plate 6, the partition plate 10, and the left rear vertical plate 11.

A plurality of, for example, two pieces of bolt insertion holes 10A located on a right side in the left-right direction are provided at an interval in a vertical direction on the partition plate 10. The two bolt insertion holes 10A are for bolts 20 for fixing the front side frame 18B of the frame member 18 constituting the heat exchanging device 17 to be inserted into the partition plate 10.

On the other hand, at positions of the partition plate 10 closer to the left side, a plurality of, for example, two pieces of female screw holes 10B are provided by being located in the vicinity of the left rear vertical plate 11 at an interval in the vertical direction. This female screw hole 10B is formed by welding a nut coaxially with a through hole drilled in the partition plate 10, for example (so-called weld nut). Other than that, a female screw (thread) may be directly engraved in the partition plate 10 as the female screw hole 10B. Into this female screw hole 10B, a bolt 37 which will be described later for mounting a left front leg part 28 of the support member 26 which will be described later is screwed.

The left rear vertical plate 11 includes a left rear end plate 11A installed upright on a rear end portion of the bottom plate 6 so as to face the partition plate 10 in the front-rear direction and a left vertical plate member 11B installed upright extending in the front-rear direction between the partition plate 10 and the left rear end plate 11A. On the left rear end plate 11A, a plurality of, for example, two pieces of female screw holes 11A1 are provided at an interval in the vertical direction by being located in the vicinity of the left side of the left vertical plate member 11B. This female screw hole 11A1 is formed of a weld nut, for example, similarly to the female screw hole 10B of the partition plate 10 which will be described later. The bolts 37 for mounting left rear leg parts 29 of the support member 26 are screwed into the two female screw holes 11A1.

The right rear vertical plate 12 includes a right rear end plate 12A installed upright on the rear end portion of the bottom plate 6 so as to face the partition plate 10 in the front-rear direction and a right vertical plate member 12B installed upright extending in the front-rear direction between the partition plate 10 and the right rear end plate 12A.

The heat exchanging device mounting base 13 is formed as a lengthy plate body mounted on the right vertical plate member 12B of the right rear vertical plate 12 by extending in the front-rear direction. On this heat exchanging device mounting base 13, a plurality of, four pieces of, for example, bolt insertion holes 13A are penetrated in the vertical direction and provided at intervals in the front-rear direction.

The floor mounting member 14 constitutes a base on which a front-side portion of a floor member 30 which will be described later and a right front column 34D of a canopy 34 are mounted. At a right-side position of the floor mounting member 14, a female screw hole 14A into which a bolt 38 which will be described later for mounting the right front column 34D is screwed is provided.

Moreover, each of the engine brackets 15 is arranged with a desired interval dimension in the front-rear direction and the left-right direction. Each of the engine brackets 15 is to elastically support the engine 16 through a vibration isolating mount 16A which will be described later.

Figure 3:
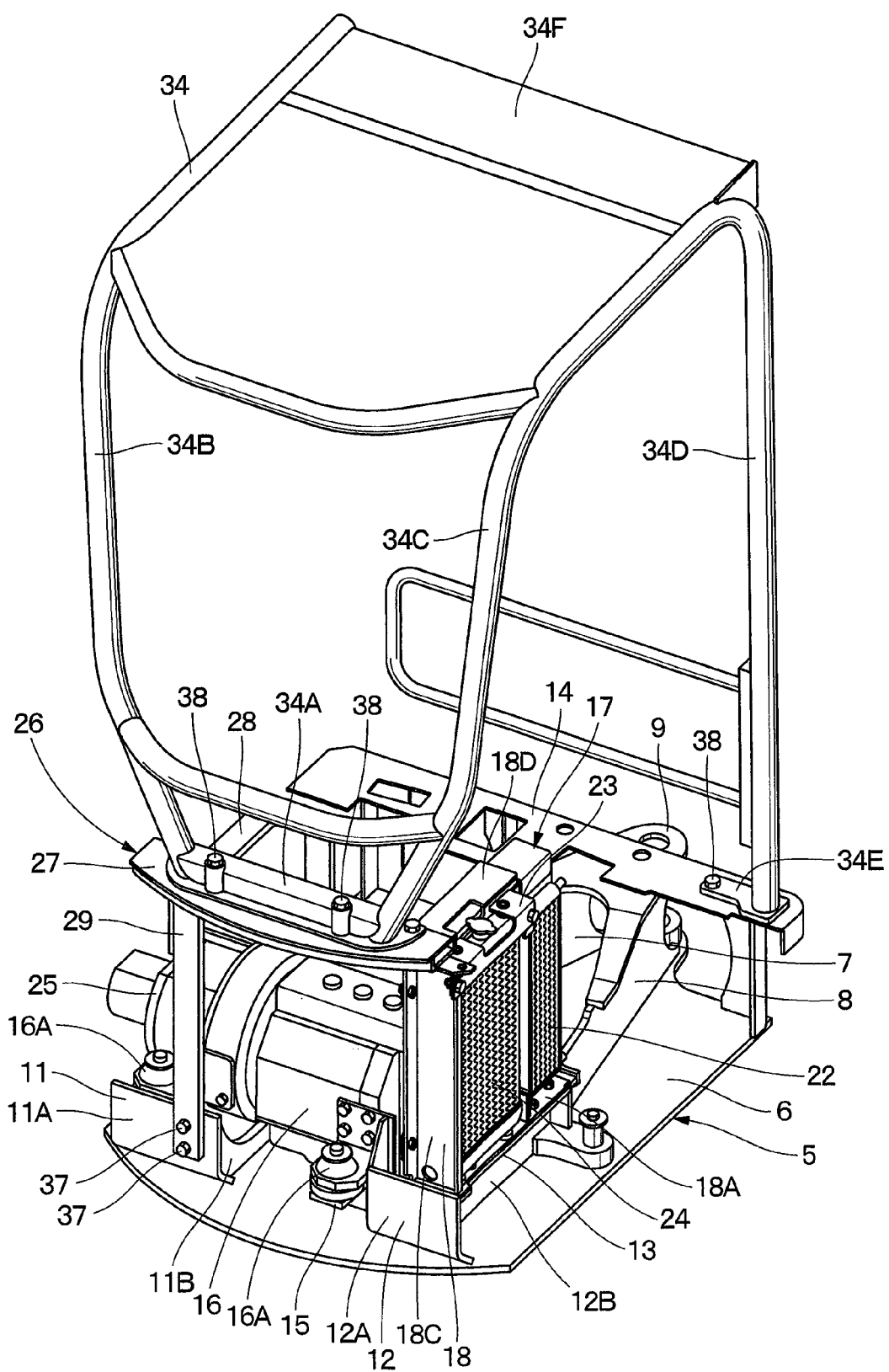
FIG. 3 is a perspective view of a state in which an engine, a heat exchanging device, a support member, and a canopy are mounted on a revolving frame when seen from a rear right side.
Figure 4:
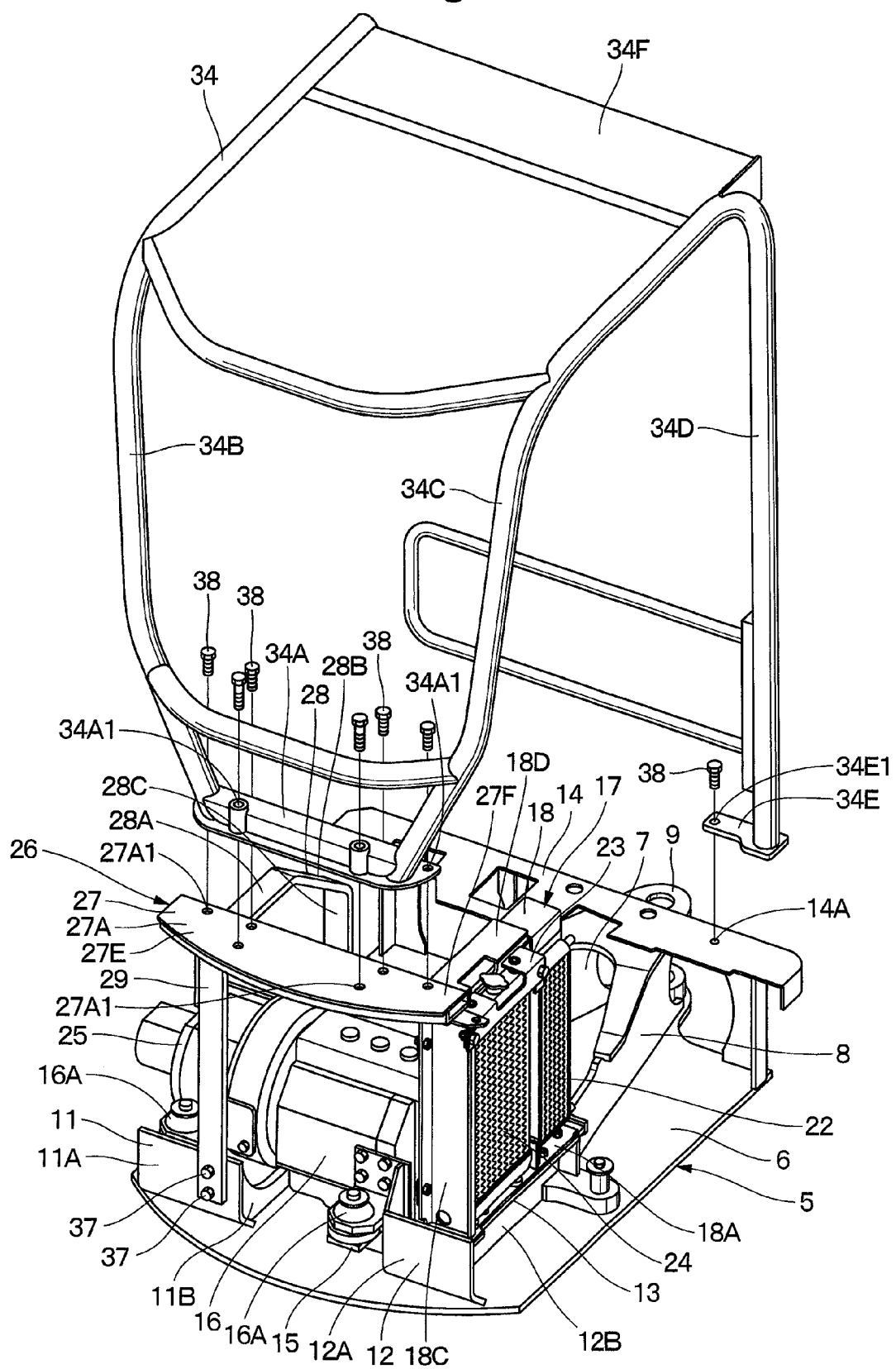
FIG. 4 is an exploded perspective view of a state in which the revolving frame and the support member are separated from the canopy when seen from a position similar to FIG. 3.
Figure 6:
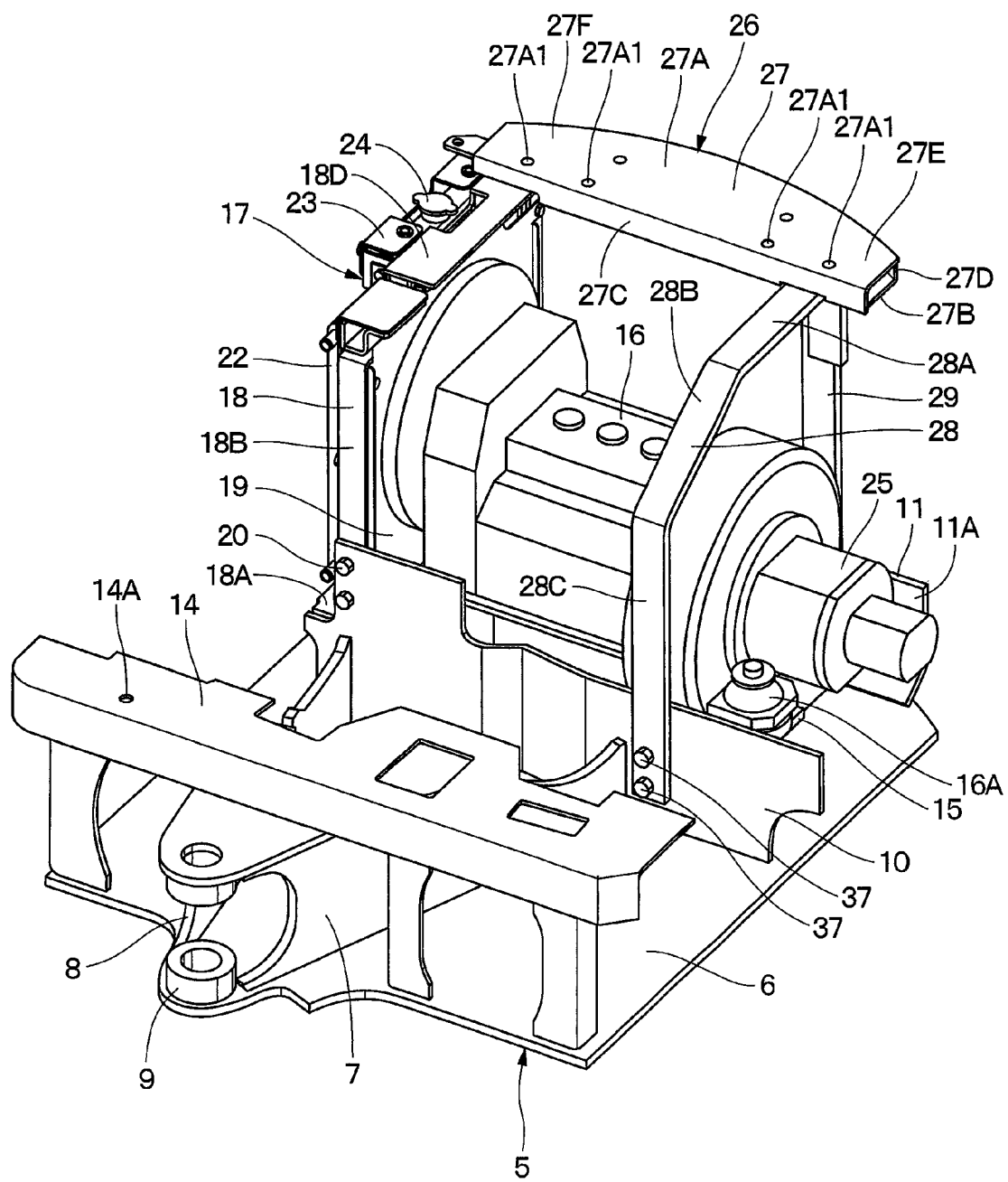
FIG. 6 is a perspective view of the state in which a floor member is removed from the revolving frame when seen from a position similar to FIG. 5.

As shown in FIGS. 3, 4, and 6, the engine 16 is to be provided on the rear side of the revolving frame 5, and the engine 16 is arranged in a laterally placed state extending in the left-right direction between the partition plate 10 and each of the rear vertical plates 11 and 12 as well as the rear end plates 11A and 12A. The engine 16 is mounted on each of the engine brackets 15 in a vibration isolated state through the vibration isolating mount 16A. This engine 16 is provided with a cooling fan (not shown) located on one side in the left-right direction, that is, on the right side, for example, and the heat exchanging device 17 which will be described later is arranged by being faced with this cooling fan. On the other hand, on the other side of the engine 16, that is, on the left side, for example, the hydraulic pump 25 which will be described later is mounted.

Here, since the small-sized hydraulic excavator 1 has a small installation space on the revolving frame 5, the operator's seat 31 which will be described later and the like are arranged on the upper side of the engine 16 in order to effectively use the limited space. In order to enable this configuration, the support member 26 for supporting the operator's seat 31 and the like is provided at an upper-side position of the engine 16 on the rear side of the revolving frame 5.

Subsequently, the heat exchanging device 17 according to this embodiment for cooling engine-cooling water for cooling the engine 16 and hydraulic oil for operating various actuators will be explained. The frame member 18 constituting this heat exchanging device 17 is used as a right-side leg part of the support member 26 in the left-right direction.

Figure 10:
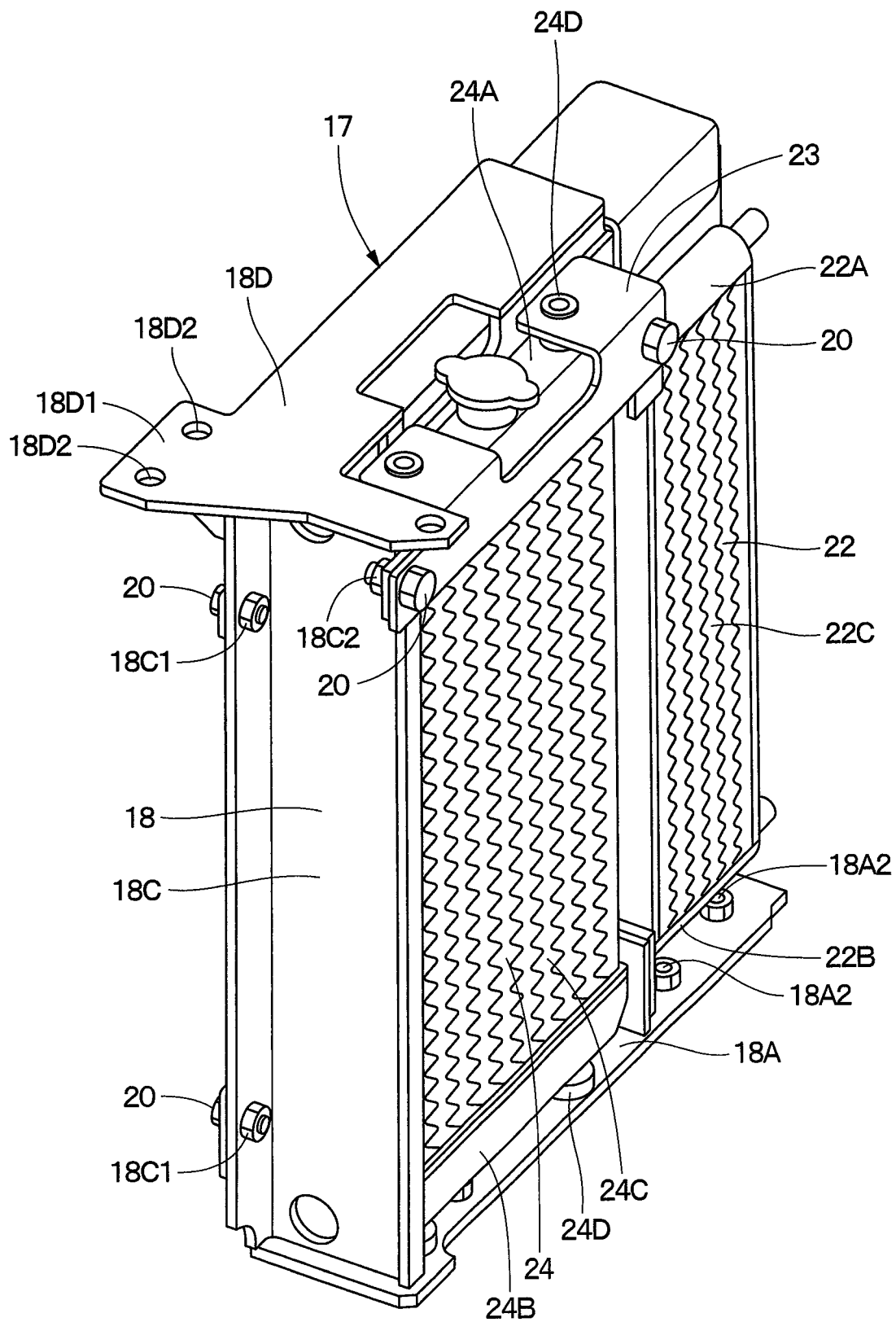
FIG. 10 is a perspective view of the heat exchanging device in FIG. 7 in an enlarged manner.
Figure 11:
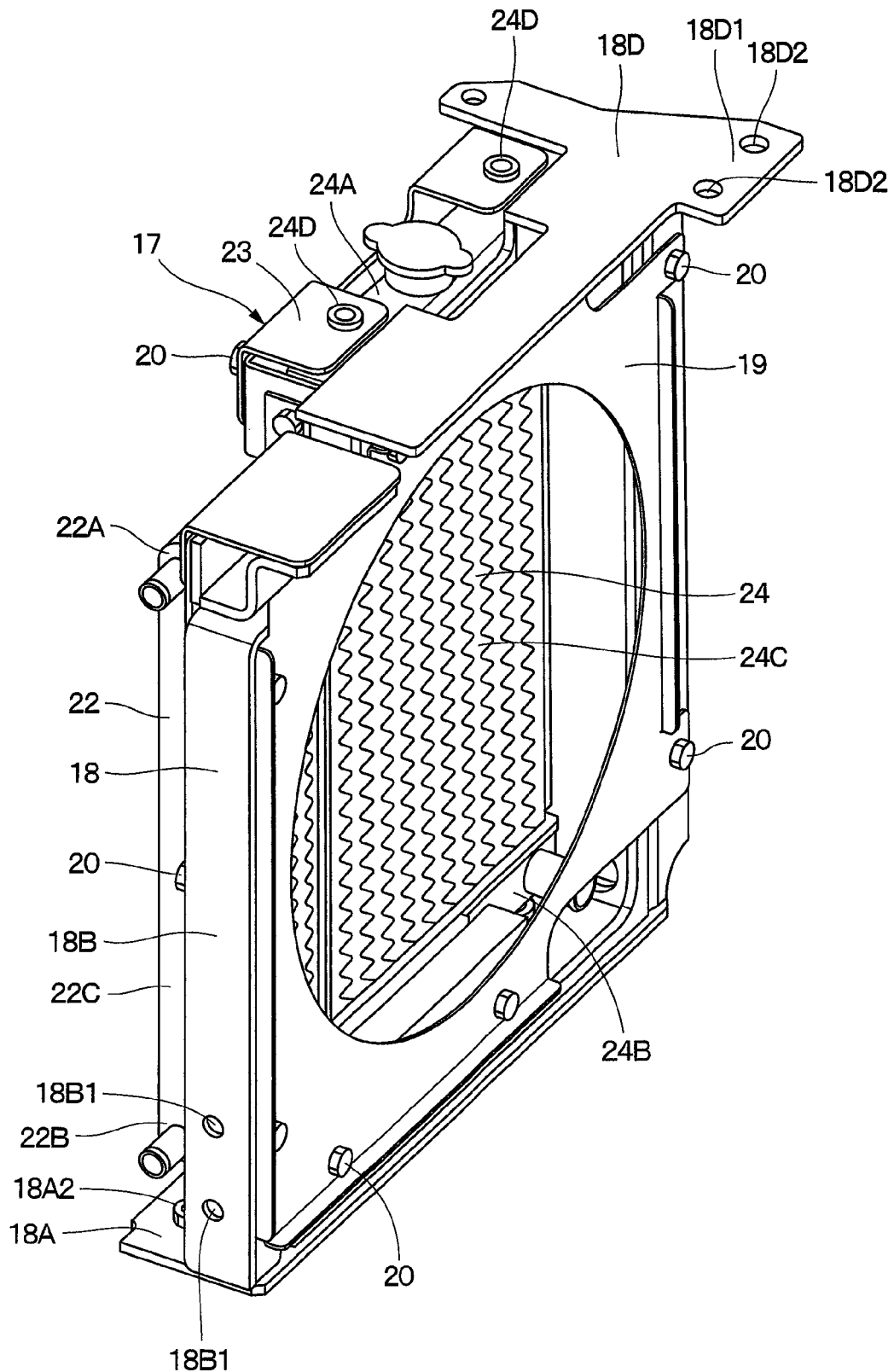
FIG. 11 is a perspective view of the heat exchanging device shown in FIG. 10 when seen from a left side in FIG. 10.
Figure 12:
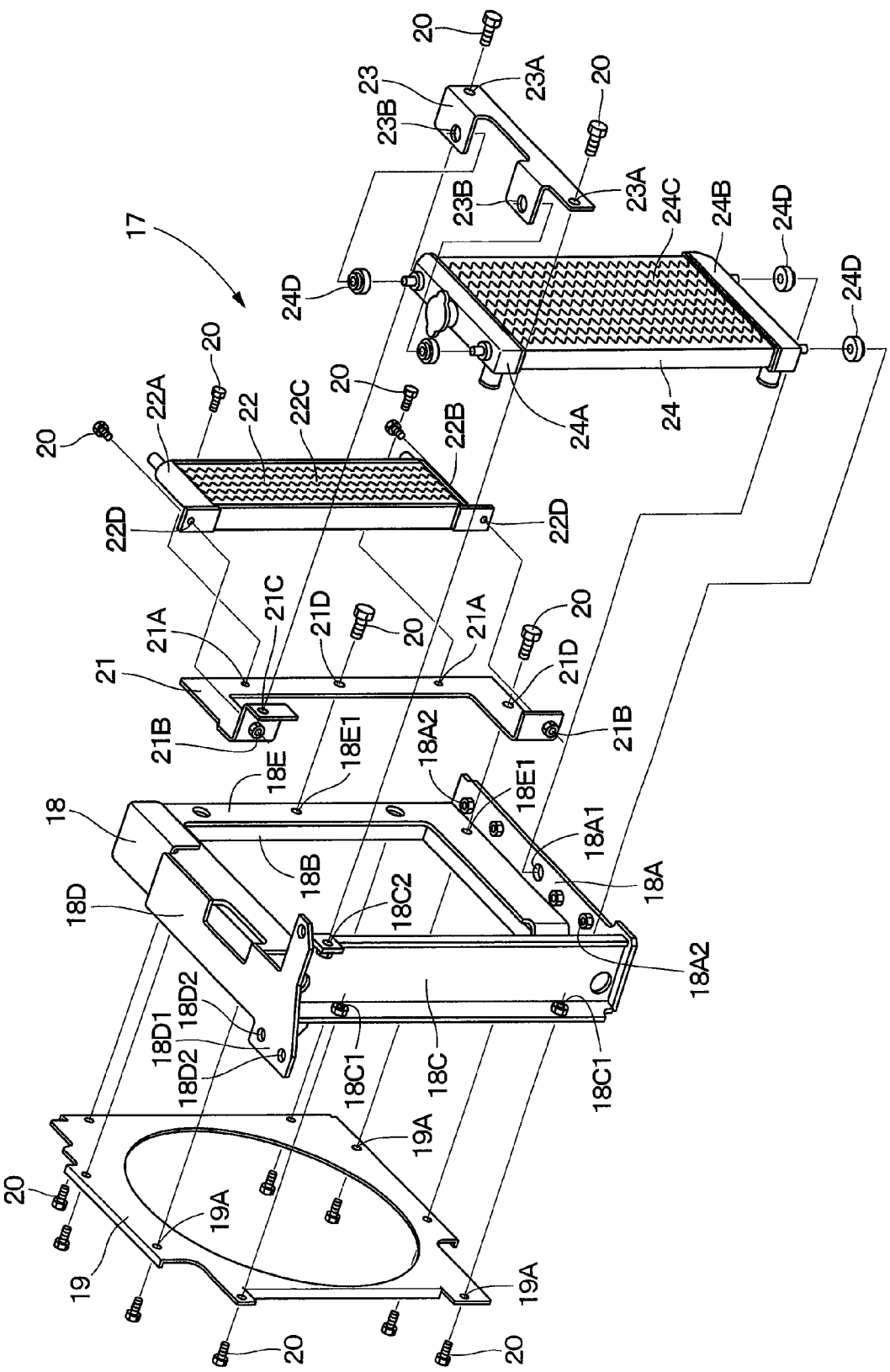
FIG. 12 is an exploded perspective view showing the heat exchanging device in an exploded state.
Figure 13:
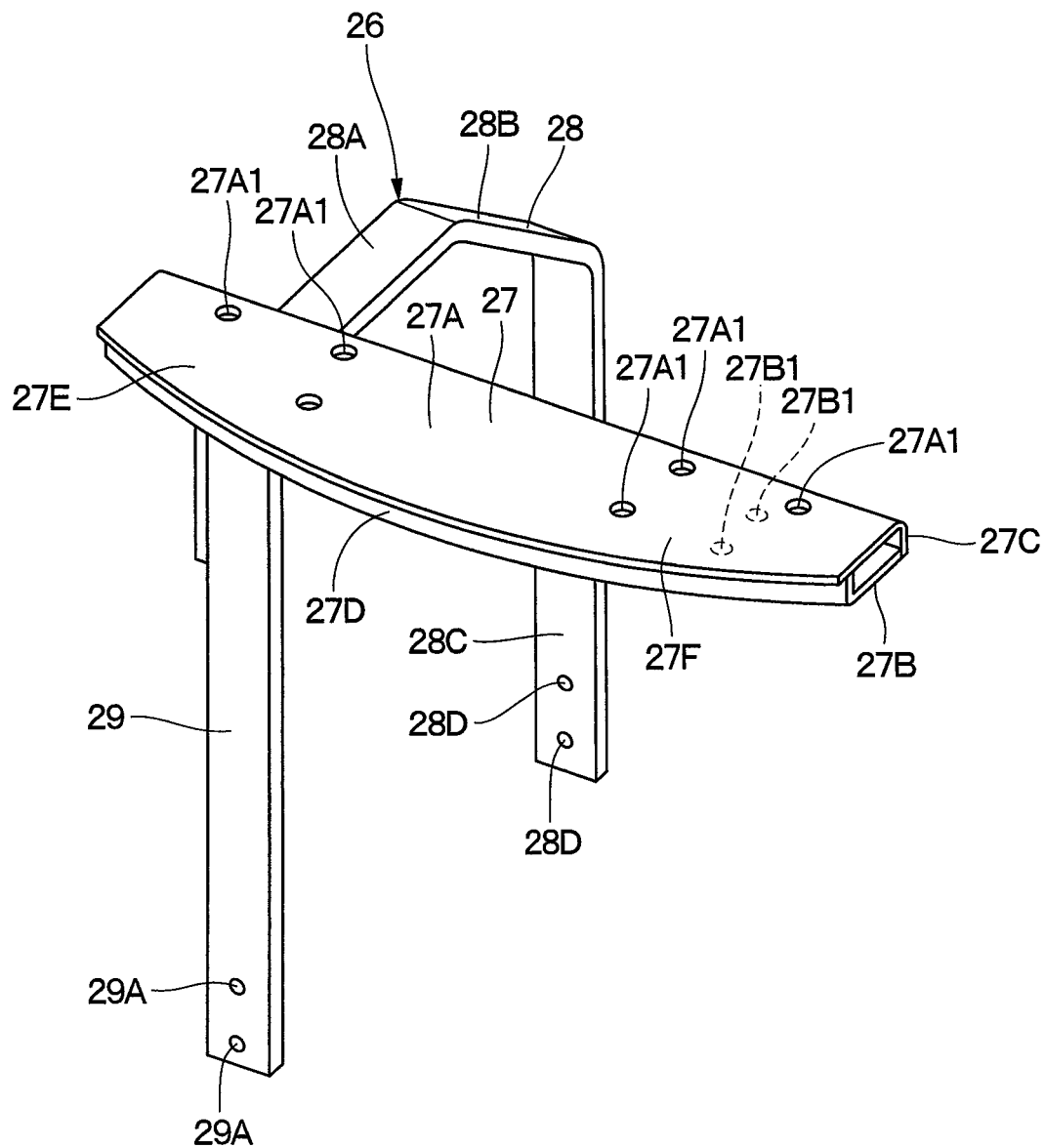
FIG. 13 is a perspective view of a single-body support member when seen form the rear right side in an enlarged manner.

The heat exchanging device 17 is provided on the revolving frame 5 by being located on the right side which becomes one side of the engine 16 in the left-right direction. As shown in FIGS. 10 to 12, this heat exchanging device 17 includes the frame member 18, an oil-cooler 22, and a radiator 24 which will be described later.

The frame member 18 forms an outer frame of the heat exchanging device 17 and this frame member 18 is formed as a frame-shaped body supporting the oil-cooler 22 and the radiator 24. That is, as shown in FIG. 12, the frame member 18 is provided with a lower frame 18A located on a lower side, extending in the front-rear direction, and mounted on the heat exchanging device mounting base 13 of the revolving frame 5, a pair of front side frames 18B and a rear side frame 18C extending from both ends of the lower frame 18A in the length direction (front-rear direction) to the upper side, and an upper frame 18D extending in the front-rear direction over the upper part of each of the side frames 18B and 18C, and the frame member 18 is formed as a four-cornered frame body (namely, a square or a rectangular shape) as a whole. On the frame member 18, a frame-shaped mounting surface plate 18E located on the outer side (right side) which becomes an upstream side of cooling air and on which the oil-cooler 22 (oil-cooler bracket 21) which will be described later is mounted is provided. On this mounting surface plate 18E, a plurality of, for example, two pieces of female screw holes 18E1 are provided at an interval in the vertical direction.

Here, the frame member 18 is formed by fixing each of the frames 18A to 18D obtained by applying various machining to steel plates and the mounting surface plate 18E as appropriate by using welding means. Therefore, the frame member 18 has high strength that can support the operator's seat 31, the canopy 34 and the like, specifically, the frame 18 has the strength equal to that of each of the leg parts 28 and 29 of the support member 26.

On the lower frame 18A of the frame member 18, two radiator mounting holes 18A1 (only one of them is shown) located closer to the rear side in the length direction (front-rear direction) and four female screw holes 18A2 formed of weld nuts corresponding to bolt insertion holes 13A provided on the heat exchanging device mounting base 13 of the revolving frame 5 are provided at intervals in the front-rear direction.

On the upper frame 18D, a mounting plate portion 18D1 is provided by extending to the rear side beyond the rear side frame 18C. On this mounting plate portion 18D1, a plurality of, for example, two pieces of bolt insertion holes 18D2 are formed at an interval in the front-rear direction by being located closer to the left side which becomes the engine 16 side. The two bolt insertion holes 18D2 are those through which the bolts 37 for fixing a free end 27F of the housing support base 27 of the support member 26 which will be described later are inserted.

On the other hand, on each of the frames 18A to 18D constituting the frame member 18, a female screw hole 18C1 (only the rear side frame 18C is shown) for mounting a fan cover 19 is provided. Moreover, as shown in FIG. 11, two female screw holes 18B1 are provided at positions corresponding to the bolt insertion holes 10A provided on the partition plate 10 of the revolving frame 5 on the lower side of the front side frame 18B. On the upper part of the rear side frame 18C, one female screw hole 18C2 for mounting the radiator bracket 23 is provided.

The fan cover 19 is provided on the engine 16 side of the frame member 18. This fan cover 19 is to cover the periphery of the cooling fan of the engine 16 and is mounted on the frame member 18 by screwing a bolt 20 as a fastening member inserted through a bolt insertion hole 19A into each of the female screw holes 18C1.

The oil-cooler bracket 21 is to be mounted on the mounting surface plate 18E of the frame member 18, and the oil-cooler bracket 21 is formed as a C-shaped or U-shaped plate body opened to the rear side. On the oil-cooler bracket 21, two female screw holes 21A are provided by being located in an intermediate portion in the vertical direction. On the other hand, a female screw hole 21B is provided on upper and lower end portions of the oil-cooler bracket 21 so as to be screwed from a front side. On an upper end portion of the oil-cooler bracket 21, a female screw hole 21C is provided so as to be screwed from the right side in the left-right direction. Moreover, a bolt insertion hole 21D is provided on an intermediate portion and a lower portion of the oil-cooler bracket 21 in the vertical direction, respectively. Here, the oil-cooler bracket 21 is mounted on the frame member 18 by screwing the bolt 20 inserted into each of the bolt insertion holes 21D into the female screw hole 18E1 of the mounting surface plate 18E.

The oil-cooler 22 is provided on the frame member 18 through the oil-cooler bracket 21. This oil-cooler 22 is to cool the hydraulic oil returned from the actuators provided on the lower traveling structure 2 and the working mechanism 4 to the hydraulic oil tank (not shown). The oil-cooler 22 is composed of an upper tank 22A, a lower tank 22B, and a heat radiation part 22C, and a bolt insertion hole 22D is provided at upper and lower positions of each of the tanks 22A and 22B by penetrating in the front-rear direction. Moreover, on the oil-cooler 22, two bolt insertion holes (not shown) are provided also on the front-side position of the heat radiation part 22C.

The oil-cooler 22 is mounted on the oil-cooler bracket 21 by screwing the bolt 20 inserted into each of the bolt insertion holes 22D into the female screw hole 21B of the oil-cooler bracket 21 and by screwing the bolt 20 inserted into the other bolt insertion hole into a female screw hole 21A of the oil-cooler bracket 21.

The radiator bracket 23 is to be mounted on the upper right side of the frame member 18, and the radiator bracket 23 constitutes an upper fixing member for fixing the radiator 24 to the frame member 18. On the radiator bracket 23, a bolt insertion hole 23A located on an end portion in the front-rear direction and penetrating in the left-right direction is formed. On the other hand, on the radiator bracket 23, a radiator mounting hole 23B is provided at a position faced with the radiator mounting hole 18A1 of the lower frame 18A of the frame member 18 sandwiching the radiator 24. The radiator bracket 23 is mounted on the upper part of the frame member 18 by screwing the bolt 20 inserted into the bolt insertion hole 23A on the front side into the female screw hole 21C of the oil-cooler bracket 21 and by screwing the bolt 20 inserted into the bolt insertion hole 23A on the rear side into the female screw hole 18C2 of the rear side frame 18C of the frame member 18.

The radiator 24 is provided on the frame member 18 by being located on the rear side of the oil-cooler 22, and the radiator 24 is to cool the engine-cooling water whose temperature has been risen by cooling the engine 16. The radiator 24 is formed of the upper tank 24A, the lower tank 24B, and the heat radiation part 24C, and each of the tanks 24A and 24B is connected to a water jacket (not shown) of the engine 16. The radiator 24 has the upper tank 24A supported by the radiator mounting hole 23B of the radiator bracket 23 through the vibration isolating member 24D and the lower tank 24B supported by the radiator mounting hole 18A1 of the lower frame 18A through the vibration isolating member 24D. As a result, the oil-cooler 22 and the radiator 24 are arranged in parallel so as to be juxtaposed in the front-rear direction with respect to a flow direction (left-right direction) of the cooling air.

Figure 7:
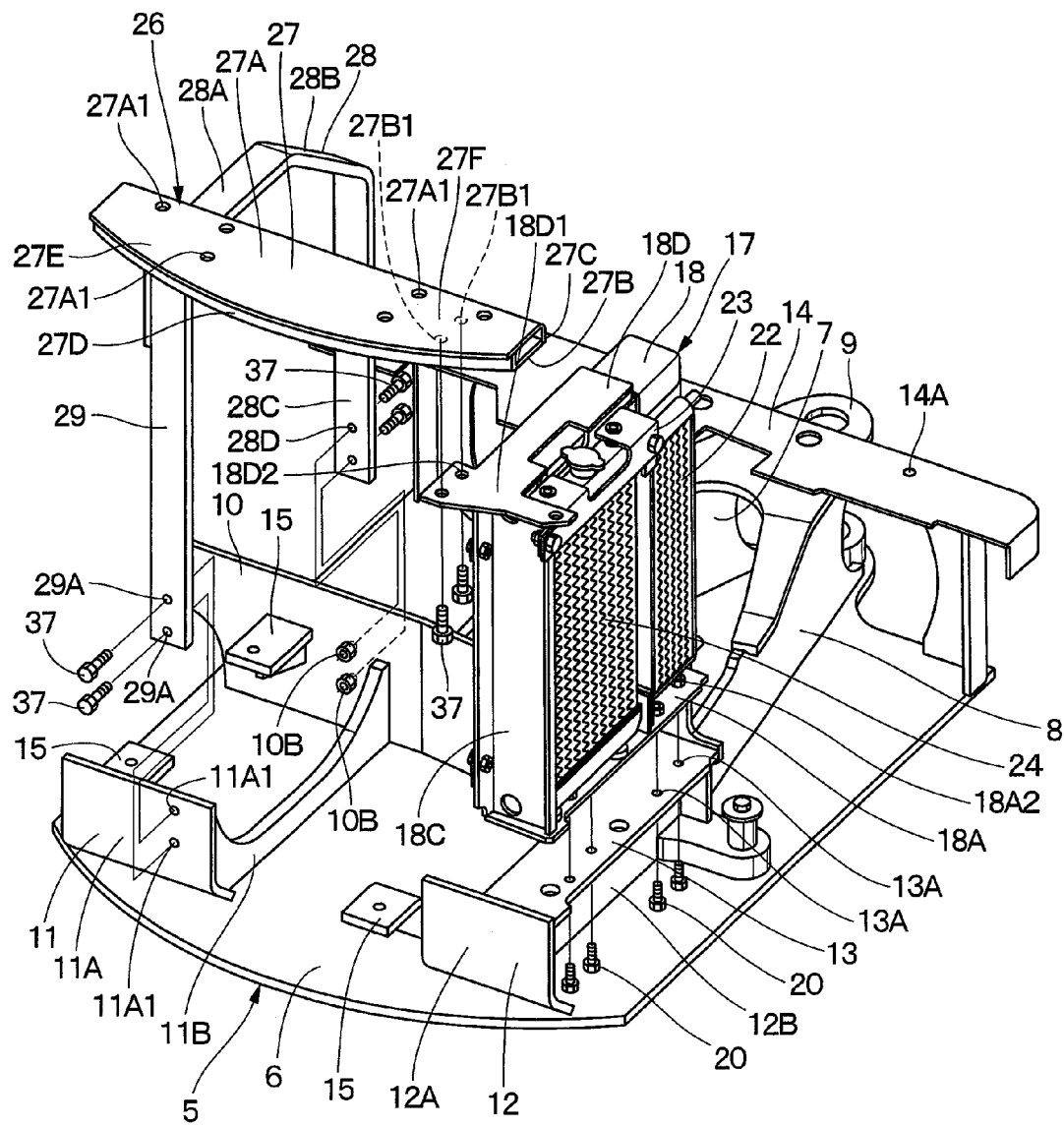
FIG. 7 is an exploded perspective view of the revolving frame, the heat exchanging device, and the support member in a separated state when seen from the rear right side.

Regarding the heat exchanging device 17 configured as above, the lower frame 18A of the frame member 18 is placed on the heat exchanging device mounting base 13 of the revolving frame 5. In this state, as shown in FIG. 7, the bolt 20 inserted into the bolt insertion hole 13A from the lower side of the lower frame 18A is screwed into the female screw hole 18A2 of the lower frame 18A. Moreover, the bolt 20 inserted into the bolt insertion hole 10A of the partition plate 10 is screwed into the female screw hole 18B1 of the front side frame 18B. As a result, the heat exchanging device 17 can be firmly fixed to the right rear vertical plate 12 of the revolving frame 5.

As shown in FIG. 6, the hydraulic pump 25 is provided by being located on the left side which becomes the other side of the engine 16 in the left-right direction. This hydraulic pump 25 is to raise the pressure of the hydraulic oil and to deliver it to each of the actuators.

Subsequently, a configuration of the support member 26 which is a feature portion of this embodiment provided for supporting the operator's seat 31, the canopy 34 and the like on the upper side of the engine 16 will be described.

The support member 26 is provided on the revolving frame in the state straddling the engine 16 from the upper side. This support member 26 is to support the operator's seat 31 and the canopy 34. The support member 26 has a function of arranging the operator's seat 31, the canopy 34 and the like which will be described later on the upper side of the engine 16 in order to effectively use the limited space on the revolving frame 5. Here, the support member 26 is composed of the housing support base 27 which will be described later, the left front leg part 28, and the left rear leg part 29.

Figure 14:
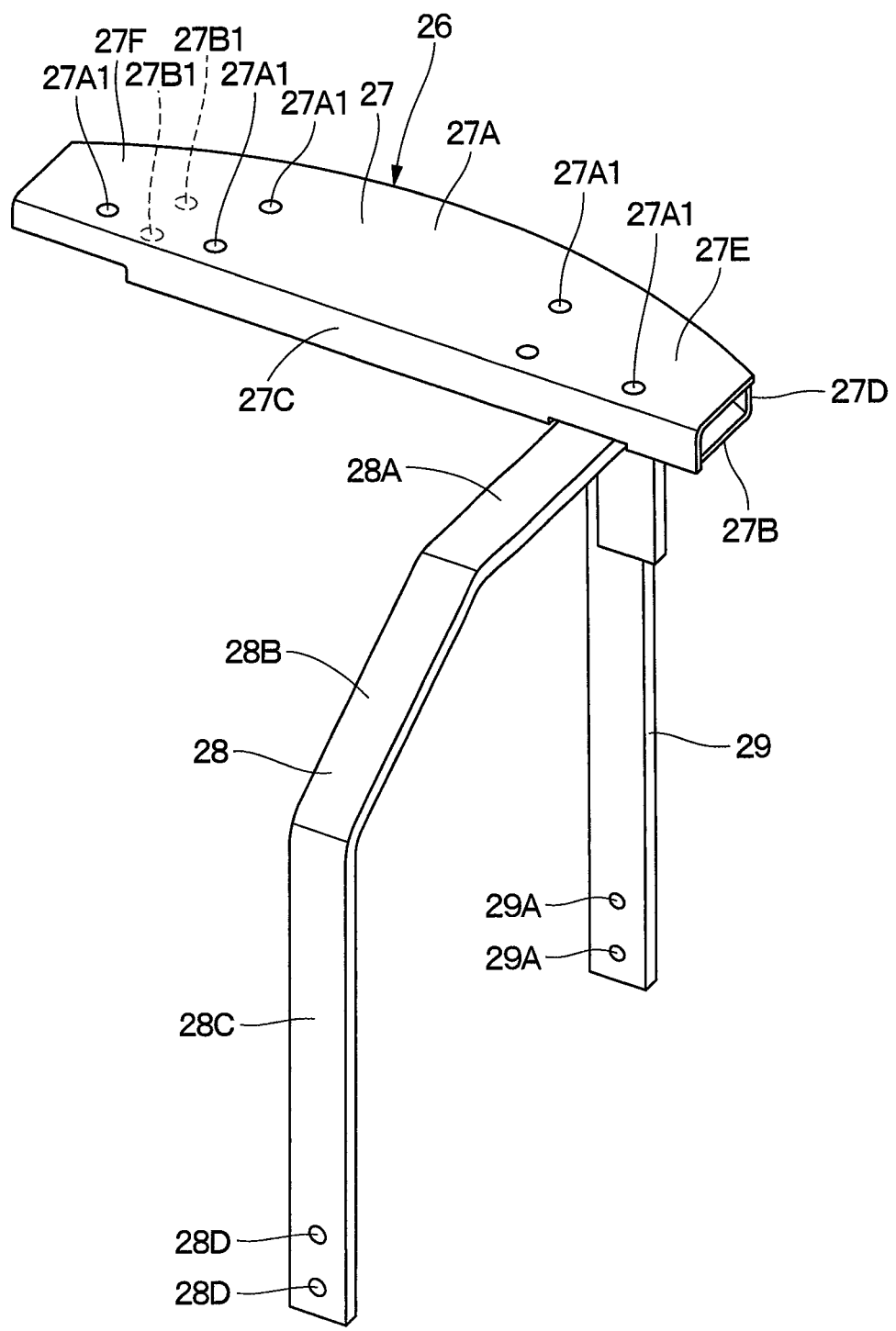
FIG. 14 is a perspective view of the single-body support member when seen from the front left side in an enlarged manner.

The housing support base 27 is provided by extending in the left-right direction on the upper side of the engine 16. As shown in FIGS. 3 and 4, a rear mounting plate 34A of the canopy 34 which will be described later is mounted on this housing support base 27. This housing support base 27 forms a box body which is lengthy in the left-right direction and flat in the vertical direction in order to acquire strength for supporting the rear side of the canopy 34. Specifically, as shown in FIG. 14, the housing support base 27 is formed of an upper plate 27A, a lower plate 27B, a front plate 27C, and a rear plate 27D. On the upper plate 27A of the housing support base 27, a plurality of, three each at left-right positions in total of six of, for example, female screw holes 27A1 are provided in order to fix the rear mounting plate 34A of the canopy 34.

On the lower plate 27B of the housing support base 27, the left front leg part 28 and the left rear leg part 29 which will be described later are mounted by being located on the left side which becomes the other side in the left-right direction. As a result, the left-side portion of the housing support base 27 becomes a fixed end 27E fixed to each of the leg parts 28 and 29 and a right-side portion which becomes one side is the free end 27F on which the leg part is not provided.

Here, on the lower plate 27B of the housing support base 27, a plurality of, for example, two pieces of female screw holes 27B1 (indicated by dotted lines in FIGS. 13 and 14) are provided by being located on the free end 27F side. The two female screw holes 27B1 are arranged at an interval in the front-rear direction so as to correspond to the bolt insertion holes 18D2 provided on the upper frame 18D of the frame member 18 of the heat exchanging device 17.

The left front leg part 28 is provided by being located on the fixed end 27E side which is the other end of the housing support base 27 in the left-right direction. This left front leg part 28 has the upper end mounted on the lower plate 27B of the housing support base 27 and has the lower end mounted on the partition plate 10 of the revolving frame 5. That is, the left front leg part 28 is composed of a lateral leg 28A extending to the front side from the lower plate 27B of the housing support base 27, an inclined leg 28B extending diagonally to the lower side from a front end of the lateral leg 28A, and a vertical leg 28C extending downward from a tip end of the inclined leg 28B. On the lower side of the vertical leg 28C, a plurality of, for example, two pieces of bolt insertion holes 28D are provided. The two bolt insertion holes 28D are arranged at an interval in the vertical direction so as to correspond to the female screw holes 10B provided on the partition plate 10.

The left rear leg part 29 is provided on the fixed end 27E side of the housing support base 27 by being located on the rear side of the left front leg part 28. This left rear leg part 29 is provided by extending in the vertical direction, the upper end thereof is mounted on the lower plate 27B of the housing support base 27, and the lower end is mounted on the left rear end plate 11A of the revolving frame 5. On the lower side of the left rear leg part 29, a plurality of, for example, two pieces of bolt insertion holes 29A are provided. The two bolt insertion holes 29A are arranged at an interval in the vertical direction so as to correspond to the female screw holes 11A1 provided on the left rear end plate 11A of the left rear vertical plate 11.

Figure 8:
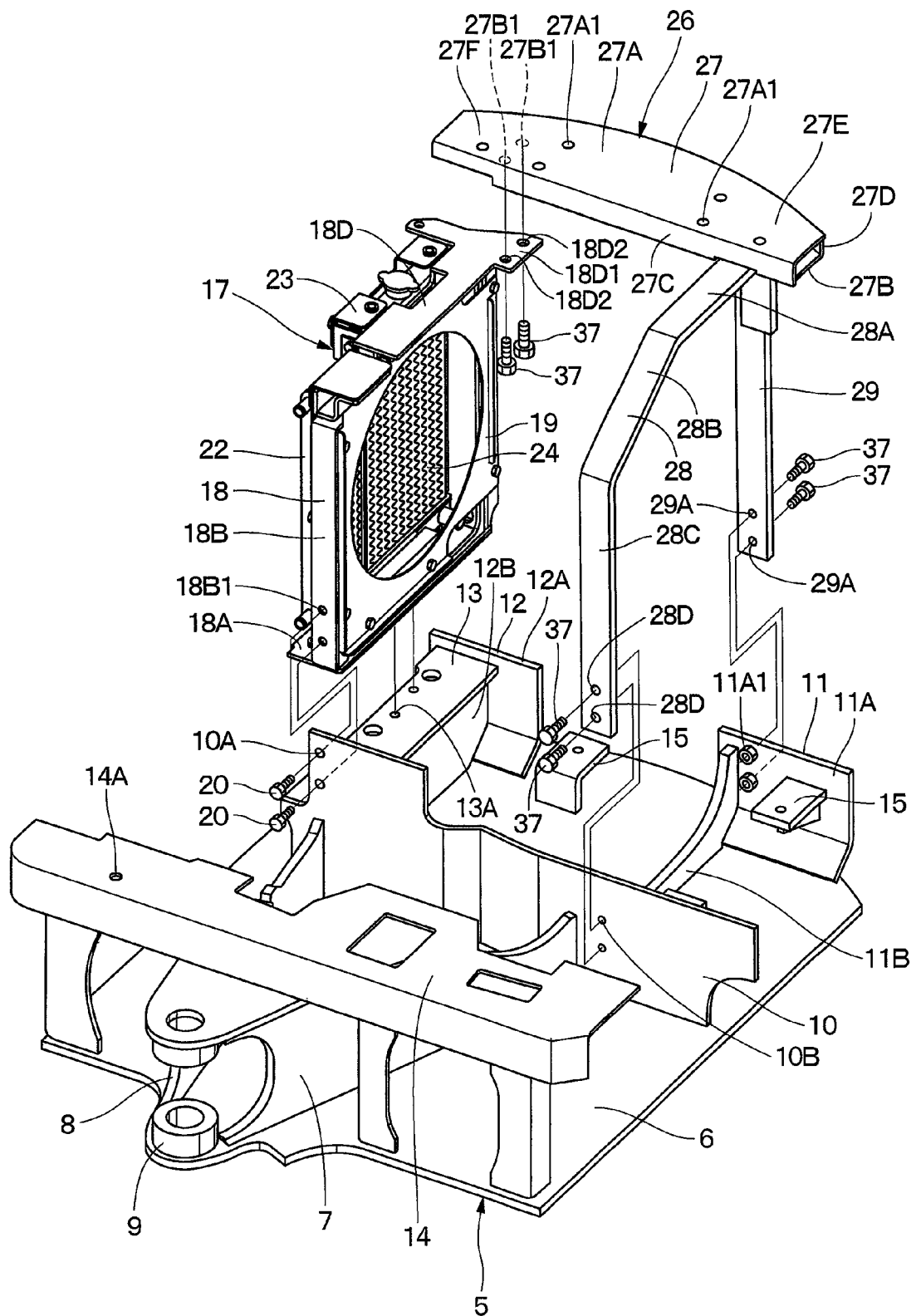
FIG. 8 is an exploded perspective view of the revolving frame, the heat exchanging device, and the support member in a separated state when seen from the front left side.

As shown in FIGS. 7 and 8, the support member 26 configured as above is arranged so as to straddle the engine 16 in the front-rear direction by the left front leg part 28 and the left rear leg part 29, and the bolt 37 inserted into the bolt insertion hole 28D of the left front leg part 28 is screwed into the female screw hole 10B provided on the partition plate 10 of the revolving frame 5. On the other hand, regarding the left rear leg part 29, the bolt 37 inserted into the bolt insertion hole 29A is screwed into the female screw hole 11A1 provided on the left rear end plate 11A of the revolving frame 5. In this state, the free end 27F side of the housing support base 27 is arranged on the frame member 18 of the heat exchanging device 17.

Thus, by screwing the bolt 37 inserted from the lower side of the bolt insertion hole 18D2 provided on the mounting plate portion 18D1 of the upper frame 18D of the frame member 18 into the female screw hole 27B1 provided on the lower plate 27B of the housing support base 27, the free end 27F side of the housing support base 27 can be fixed on the upper surface side of the frame member 18. In this case, the frame member 18 can support the housing support base 27 in a horizontal state by making its height dimension accord with the height dimension of each of the leg parts 28 and 29.

As a result, as shown in FIGS. 4 and 6, the support member 26 can use the frame member 18 of the heat exchanging device 17 as a right-side leg part supporting the free end 27F of the housing support base 27. Therefore, the right-side leg part can be omitted in the support member 26.

Figure 2:
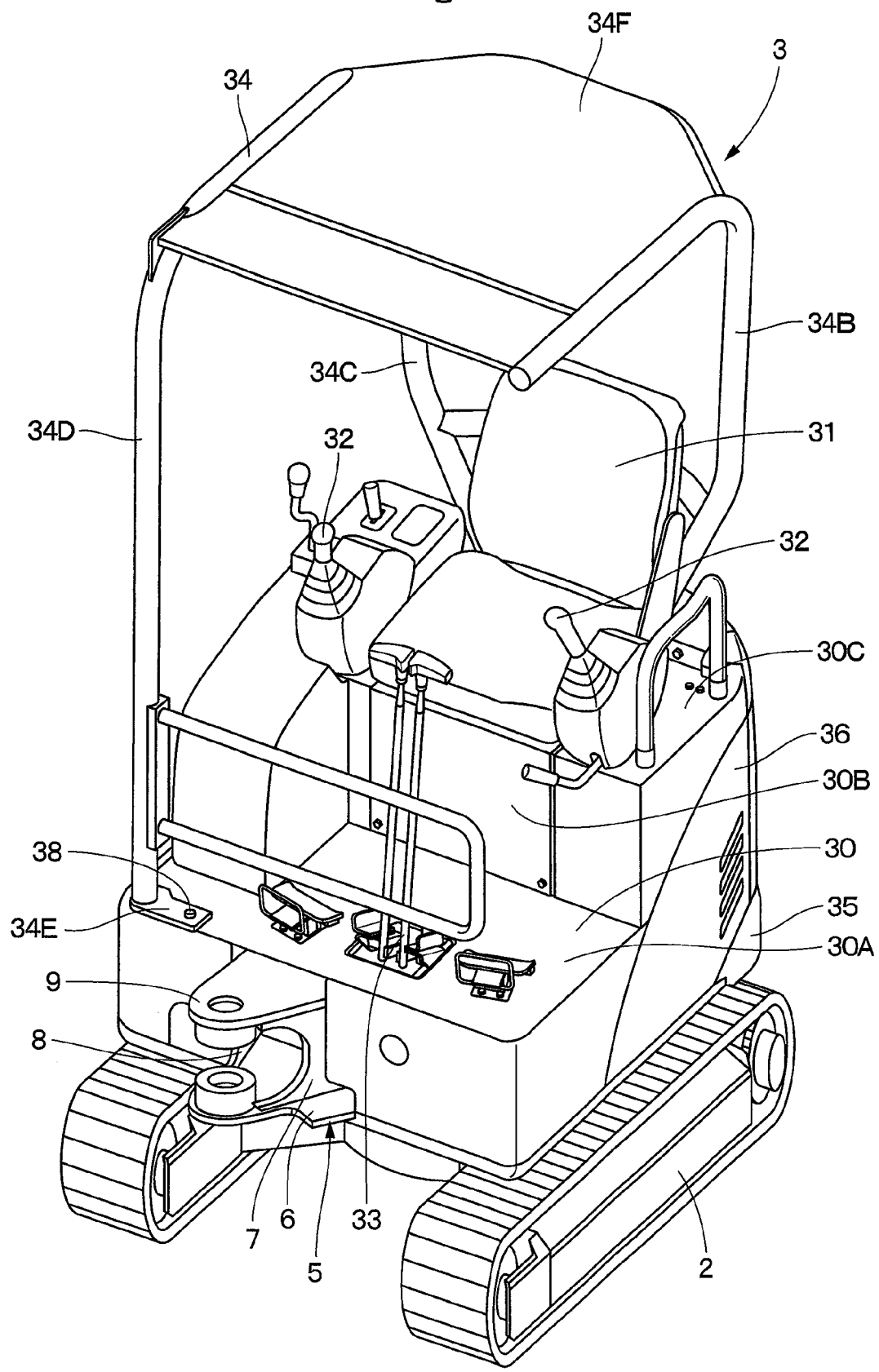
FIG. 2 is a perspective view of a small-sized hydraulic excavator in which a working mechanism is omitted when seen from a front left side.
Figure 5:
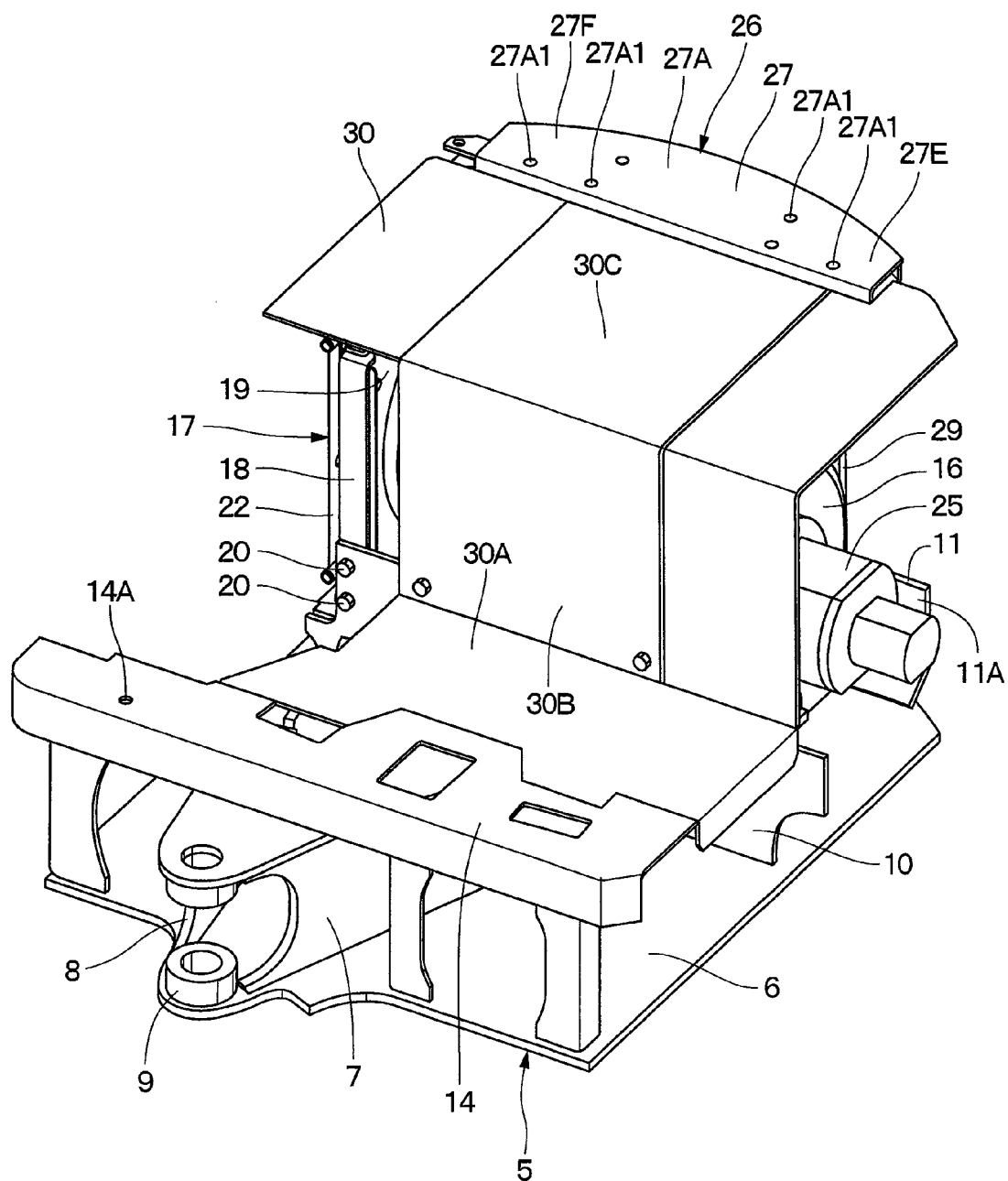
FIG. 5 is a perspective view of the state in which the engine, the heat exchanging device, the support member, and the floor member are mounted on the revolving frame when seen from the front left side.

As shown in FIGS. 2 and 5, the floor member 30 is provided on the revolving frame 5 over from the upper side to the front side of the engine 16. This floor member 30 is formed in a stepped state of a substantially flat footrest plate 30A extending from the floor mounting member 14 of the revolving frame 5 to the rear side, a riser plate 30B rising from a rear part of the footrest plate 30A, and an operator's seat mounting plate 30C extending from the upper part of the riser plate 308 to the rear side. The operator's seat mounting plate 30C on the rear side is mounted on the frame member 18 of the heat exchanging device 17 and the left front leg part 28 of the support member 26, for example.

The operator's seat 31 is provided on the operator's seat mounting plate 30C of the floor member 30, and the operator's seat 31 is on which the operator is seated. As shown in FIG. 2, a control lever 32 for work is disposed on the both left-right sides of the operator's seat 31, and a control lever/pedal 33 for traveling is disposed on the front side of the operator's seat 31.

The three-column type canopy 34 constitutes a housing provided on the upper revolving structure 3, and the canopy 34 is to cover the upper part of the operator's seat 31. As shown in FIGS. 3 and 4, the canopy 34 includes a rear mounting plate 34A faced with the housing support base 27 of the support member 26, a left rear column 34B located on the left rear side of the operator's seat 31 and extending upward from an upper surface of the rear mounting plate 34A, a right rear column 34C located on the right rear side of the operator's seat 31 and extending upward from the upper surface of the rear mounting plate 34A, a right front column 34D extending upward from a right-side position of the floor mounting member 14 of the revolving frame 5, a front mounting plate 34E provided on a lower part of the right front column 34D and faced with the floor mounting member 14, and a roof part 34F provided on an upper part of each of the columns 34B to 34D.

On the rear mounting plate 34A, six bolt insertion holes 34A1 corresponding to each of the female screw holes 27A1 provided on the upper plate 27A of the housing support base 27 are provided. On the other hand, on the front mounting plate 34E, a bolt insertion hole 34E1 corresponding to the female screw hole 14A of the floor mounting member 14 is provided.

Here, regarding the canopy 34, the rear mounting plate 34A is placed on the housing support base 27 of the support member 26, and the front mounting plate 34E is placed on the floor mounting member 14 of the revolving frame 5. In this state, the bolt 38 inserted into each of the bolt insertion holes 34A1 of the rear mounting plate 34A is screwed into each of the female screw holes 27A1 of the upper plate 27A of the housing support base 27. As a result, the rear side of the canopy 34 can be mounted on the support member 26. On the other hand, the right front side of the canopy 34 can be mounted on the revolving frame 5 by screwing the bolt 38 inserted into the bolt insertion hole 34E1 of the front mounting plate 34E into the female screw hole 14A of the floor mounting member 14.

It should be note that a counterweight 35 is mounted on a rear end portion of the revolving frame 5. This counterweight 35 is to take weight balance with the working mechanism 4 and is formed as a heavy article having a substantially arc shape.

An exterior cover 36 is provided on the revolving frame 5 over from the rear side of the canopy 34 to the side. This exterior cover 36 is to cover the engine 16, the heat exchanging device 17 and the like mounted on the revolving frame 5.

The bolt 37 forms a fastening member and is used for mounting each of the leg parts 28 and 29 of the support member 26 on the revolving frame 5. Moreover, the bolt 37 is used for mounting the free end 27F of the housing support base 27 on the frame member 18 of the heat exchanging device 17. On the other hand, the bolt 38 forms a fastening member and is used for mounting the canopy 34 on the revolving frame 5 and the housing support base 27 of the support member 26.

The hydraulic excavator 1 according to this embodiment has the configuration as configured above, and subsequently, an operation of this hydraulic excavator 1 will be described.

First, the operator gets onboard the upper revolving structure 3 and is seated on the operator's seat 31. By operating the control lever/pedal 33 for traveling in this state, the lower traveling structure 2 is driven so that the hydraulic excavator 1 can be advanced/retreated. On the other hand, the operator seated on the operator's seat 31 can perform an excavating work of earth and sand by operating the working mechanism 4 and the like through operation of the control lever 32 for work.

Here, a work procedure when the heat exchanging device 17, the support member 26, and the canopy 34 are mounted on the revolving frame 5 constituting the upper revolving structure 3 will be described. The work procedure in this case exemplifies one of some work procedures, and they can be mounted by another work procedure.

As shown in FIG. 7, when the heat exchanging device 17 is to be mounted on the revolving frame 5, the lower frame 18A of the frame member 18 is placed on the heat exchanging device mounting base 13 of the revolving frame 5. In this state, the bolt 20 inserted into the bolt insertion hole 13A is screwed into the female screw hole 18A2 of the lower frame 18A from the lower side of the lower frame 18A. Moreover, as shown in FIG. 8, the bolt 20 inserted into the bolt insertion hole 10A of the partition plate 10 is screwed into the female screw hole 18B1 of the front side frame 18B. As a result, the heat exchanging device 17 can be mounted on the revolving frame 5.

When the heat exchanging device 17 has been mounted on the revolving frame 5, a work is proceeded to a mounting work of the support member 26. In this case, the support member 26 is arranged so as to straddle the engine 16 in the front-rear direction by the left front leg part 28 and the left rear leg part 29, and the bolt 37 inserted into the bolt insertion hole 28D of the left front leg part 28 is screwed into the female screw hole 10B provided on the partition plate 10 of the revolving frame 5. As a result, the left front leg part 28 can be mounted on the partition plate 10 of the revolving frame 5.

On the other hand, in the left rear leg part 29, the bolt 37 inserted into its bolt insertion hole 29A is screwed into the female screw hole 11A1 provided on the left rear end plate 11A of the left rear vertical plate 11. As a result, the left rear leg part 29 can be mounted on the left rear vertical plate 11 of the revolving frame 5.

In this state, the free end 27F side of the housing support base 27 can be arranged on the frame member 18 of the heat exchanging device 17. Thus, the bolt 37 is inserted from the lower side into the bolt insertion hole 18D2 provided on the mounting plate portion 18D1 of the upper frame 18D of the frame member 18, and this bolt 37 is screwed into the female screw hole 27B1 provided on the lower plate 27B of the housing support base 27. As a result, the free end 27F side of the housing support base 27 can be fixed on the upper surface side of the frame member 18, and the support member 26 can be stably mounted on the revolving frame 5 by using the frame member 18 as a right-side leg part.

Subsequently, when the canopy 34 is to be mounted, as shown in FIG. 4, the rear mounting plate 34A is placed on the housing support base 27 of the support member 26, and the front mounting plate 34E is placed on the floor mounting member 14 of the revolving frame 5. In this state, the bolt 38 inserted into each of the bolt insertion holes 34A1 of the rear mounting plate 34A is screwed into each of the female screw holes 27A1 of the upper plate 27A of the housing support base 27. As a result, the rear side of the canopy 34 can be mounted on the support member 26. On the other hand, the right front side of the canopy 34 can be mounted on the revolving frame 5 by screwing the bolt 38 inserted into the bolt insertion hole 34E1 of the front mounting plate 34E into the female screw hole 14A of the floor mounting member 14.

Thus, according to this embodiment, in the heat exchanging device 17, the frame member 18 made of the frame-shaped body supporting the oil-cooler 22 and the radiator 24 and to be mounted on the revolving frame 5 is provided. The support member 26 is composed of the housing support base 27 provided by extending in the left-right direction on the upper side of the engine 16 and the left front leg part 28 and the left rear leg 29 with the upper ends mounted at the left side (fixed end 27E side) positions in the left-right direction of the housing support base 27 and the lower ends mounted on the revolving frame 5 straddling the engine 16 in the front-rear direction. In addition, the housing support base 27 of this support member 26 has the right side in the left-right direction formed as the free end 27F. Moreover, the housing support base 27 of the support member 26 is so configured that its free end 27F is mounted on the frame member 18 of the heat exchanging device 17.

Therefore, since the frame member 18 supports the oil-cooler 22 and the radiator 24, it has rigidity and can support a heavy article. On the other hand, in the support member 26, the right-side leg part in the left-right direction is omitted, and the left front leg part 28 and the left rear leg part 29 are provided only on the left side in the left-right direction. In this case, too, the housing support base 27 of the support member 26 can be stably supported in the both-side held state by each of the left-side leg parts 28 and 29 and the right-side frame member 18 by using the frame member 18 of the heat exchanging device 17 as a leg part.

As a result, when the support member 26 is to be mounted on the revolving frame 5, only by mounting each of the leg parts 28 and 29 located on the fixed end 27E side of the housing support base 27 on the revolving frame 5 and by mounting the free end 27F side of the housing support base 27 on the frame member 18 of the heat exchanging device 17, the support member 26 can be mounted on the revolving frame 5. As a result, the number of works for mounting the support member 26 on the revolving frame 5 can be reduced, and assembling workability can be improved. Moreover, for a part by which the right-side leg part is omitted, the installation space on the revolving frame 5 can be effectively used, and the size of the upper revolving structure 3 can be reduced. Furthermore, in the support member 26, the weight can be reduced for the part by which the right-side leg part is omitted, the weight of the hydraulic excavator 1 can be reduced.

On the other hand, the frame member 18 of the heat exchanging device 17 is formed as a four-cornered frame body made of the lower frame 18A, each of the side frames 18B and 18C, and the upper frame 18D. As a result, the free end 27F of the housing support base 27 constituting the support member 26 can be mounted on the upper surface side of the upper frame 18D by using the bolt 37. In this case, as compared with the instance in which the lower end of the leg part is mounted on the revolving frame 5, the free end 27F of the housing support base 27 can be mounted not on the lower part on the depth but at the upper-part position which is easily accessible. In this point, too, the assembling workability can be improved.

Moreover, since the frame member 18 of the heat exchanging device 17 can be used as the right-side leg part of the support member 26, the housing support base 27 can be firmly supported by using this frame member 18. As a result, support strength of the canopy 34 against rolling, tripping, collision of a falling article and the like, and reliability of the hydraulic excavator 1 can be improved.

It should be noted that according to this embodiment, the instance in which the oil-cooler 22 and the radiator 24 are provided in the heat exchanging device 17 is explained as an example. However, the present invention is not limited thereto, but for example, an intercooler, a condenser of an air-conditioning device, a fuel cooler and the like can be configured to be provided other than the oil-cooler 22 and the radiator 24.

According to this embodiment, the instance in which the three-column type canopy 34 provided with the three columns 34B to 34D is provided is exemplified as a housing. However, the present invention is not limited to that and may be configured to use a canopy provided with one leg part or two or four or more leg parts as a housing. On the other hand, a cab covering the periphery and the upper part of the operator's seat 31 can be applied as a housing.

In the embodiment, the crawler-type small-sized hydraulic excavator 1 is explained as an example of a construction machine. However, the present invention is not limited to that and may be applied to a small-sized hydraulic excavator provided with a wheel-type lower traveling structure, for example. Moreover, the present invention can be widely applied to other construction machines such as a small-sized hydraulic crane and the like.

DESCRIPTION OF REFERENCE NUMERALS

1: Hydraulic excavator (Construction machine)
2: Lower traveling structure
3: Upper revolving structure
4: Working mechanism
5: Revolving frame
16: Engine
17: Heat exchanging device
18: Frame member
18A: Lower frame
18B: Front side frame
18C: Rear side frame
18D: Upper frame
20, 37, 38: Bolt (Fastening member)
22: Oil-cooler
24: Radiator
25: Hydraulic pump
26: Support member
27: Housing support base
27A: Upper plate
27B: Lower plate
27E: Fixed end
27F: Free end
28: Left front leg part
29: Left rear leg part
30: Floor member
31: Operator's seat
34: Canopy (Housing)
34A: Rear mounting plate

The invention claimed is:

1. A construction machine comprising:
an automotive lower traveling structure,
an upper revolving structure rotatably mounted on said lower traveling structure, and
a working mechanism tiltably provided on a front side of said upper revolving structure,
said upper revolving structure comprises:
a revolving frame constituting a structural support body;
an engine mounted on a rear side of said revolving frame and extending in a left-right direction;
a heat exchanging device, including an oil-cooler for cooling hydraulic oil and a radiator for cooling said engine, provided on said revolving frame on one side, in the left-right direction, of said engine;
a hydraulic pump provided on the other side, in the left-right direction, of said engine;
a support member provided on said revolving frame straddling said engine from an upper side thereof;
an operator's seat arranged above said engine; and
a housing covering at least an upper part of said operator's seat and having a rear side supported by said support member,
wherein said revolving frame is constituted by:
a bottom plate made of a flat plate;
a left front vertical plate and a right front vertical plate installed upright extending toward the rear side and away from each other in the left-right direction on an upper surface side of said bottom plate;
a support bracket provided on a front end portion of each of said left front and right front vertical plates and supporting said working mechanism;
a partition plate installed upright on said bottom plate at a rear end position of each of said left front and right front vertical plates and extending in the left-right direction;
a left rear vertical plate installed upright and extending to a rear side of said left front vertical plate sandwiching said partition plate, and a left rear end plate of said left rear vertical plate installed upright on a rear end portion of said bottom plate facing said partition plate in a front-rear direction, and a right rear vertical plate installed upright extending to a rear side of said right front vertical plate sandwiching said partition plate and a right rear end plate of said right rear vertical plate installed upright on a rear end portion of said bottom plate facing said partition plate in the front-rear direction; and
a heat exchanging device mounting base extending in the front-rear direction on an upper side of one of said left rear vertical plate and said right rear vertical plate,
wherein said heat exchanging device has a frame member supporting said oil-cooler and said radiator and mounted on said heating exchanging device mounting base and mounted to said partition plate of said revolving frame,
wherein said frame member has a four-cornered frame body including a lower frame located on a lower part of said oil cooler and said radiator, extending in a front-rear direction, and mounted on said revolving frame, a pair of side frames extending upward from both ends of said lower frame in the front-rear direction, and an upper frame extending in a front-rear direction over the upper part of each of said side frames,
wherein said upper frame has a mounting plate portion extending to the rear side beyond said rear side frame in the front-rear direction and projecting over said engine, and bolt insertion holes in said mounting plate portion, and said support member is constituted by a housing support base extending in the left-right direction above said engine and constituted by a front leg part and a rear leg part each extending downward and each having an upper end mounted on a side of said housing support base in the left-right direction, wherein a lower part of said front leg part of said support member is mounted on said partition plate of said revolving frame, and a lower part of said rear leg part is mounted on one of said left rear vertical plate and right rear vertical plate, wherein the other side of said housing support base in the left-right direction is fixed to said upper frame by bolts which are inserted through said bolt insertion holes provided on said mounting plate portion of said upper frame.

2. The construction machine according to claim 1, wherein said frame member of said heat exchanging device is configured to be used as a leg part of said support member for supporting said housing support base on said other side of said housing support base in the left-right direction.

* * * * *